(12) United States Patent
Yamamoto et al.

(10) Patent No.: US 11,820,313 B2
(45) Date of Patent: Nov. 21, 2023

(54) AIRBAG DEVICE

(71) Applicant: TOYODA GOSEI CO., LTD., Kiyosu (JP)

(72) Inventors: Shuji Yamamoto, Kiyosu (JP); Koji Kawamura, Kiyosu (JP); Takenori Ozaki, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/982,973

(22) Filed: Nov. 8, 2022

(65) Prior Publication Data
US 2023/0143871 A1     May 11, 2023

(30) Foreign Application Priority Data

Nov. 9, 2021    (JP) ................................. 2021-182569

(51) Int. Cl.
*B60R 21/207*      (2006.01)
*B60R 21/233*      (2006.01)
*B60R 21/231*      (2011.01)

(52) U.S. Cl.
CPC .......... *B60R 21/207* (2013.01); *B60R 21/233* (2013.01); *B60R 2021/23146* (2013.01)

(58) Field of Classification Search
CPC ................ B60R 21/207; B60R 21/233; B60R 2021/23146
See application file for complete search history.

(56) References Cited

U.S. PATENT DOCUMENTS

| | | | | |
|---|---|---|---|---|
| 7,549,672 | B2 * | 6/2009 | Sato .................... | B60R 21/2338 |
| | | | | 280/730.2 |
| 8,469,395 | B2 * | 6/2013 | Richez ................. | B60R 21/233 |
| | | | | 280/730.2 |
| 10,493,940 | B2 * | 12/2019 | Sugishima ........... | B60R 21/233 |
| 10,870,405 | B2 * | 12/2020 | Kwon ................... | B60R 21/207 |
| 11,077,815 | B2 * | 8/2021 | Fukawatase ......... | B60R 21/233 |
| 11,351,947 | B2 * | 6/2022 | Kobayashi ........... | B60R 21/217 |
| 11,608,023 | B2 * | 3/2023 | Ikeda ................... | B60R 21/207 |

(Continued)

FOREIGN PATENT DOCUMENTS

| CN | 111660990 A | * | 9/2020 |
|---|---|---|---|
| CN | 115214518 A | * | 10/2022 |

(Continued)

*Primary Examiner* — Faye M Fleming
(74) *Attorney, Agent, or Firm* — POSZ LAW GROUP, PLC

(57) ABSTRACT

An airbag includes a main inflation portion to be deployed and inflated at an outer side of the upper body of an occupant, and an auxiliary inflation portion disposed at a position adjacent to an inner side of the main inflation portion and to be deployed and inflated at an obliquely front outer side of a head portion. In the airbag whose deployment and inflation are completed, a maximum dimension in a facing direction in which an outer main body portion and an inner main body portion of the auxiliary inflation portion face each other is smaller than a dimension in a direction orthogonal to the facing direction. The auxiliary inflation portion has the outer main body portion as a joining area, and is joined to the main inflation portion in the joining area, in a state of being in communication with the main inflation portion.

5 Claims, 4 Drawing Sheets

(56) References Cited

U.S. PATENT DOCUMENTS

2006/0131847 A1    6/2006  Sato et al.
2021/0170978 A1*  6/2021  Acker ............... B60R 21/23138
2022/0242356 A1*  8/2022  Bogdanovic ...... B60R 21/23138

FOREIGN PATENT DOCUMENTS

DE        19517764 A1 *  11/1996  ....... B60R 21/23138
JP        2006-008105 A    1/2006

\* cited by examiner

AIRBAG DEVICE

CROSS-REFERENCE TO RELATED APPLICATIONS

The present application claims the benefit of priority of Japanese Patent Application No. 2021-182569, filed on Nov. 9, 2021, the content of which is incorporated herein by reference.

TECHNICAL FIELD

The present invention relates to an airbag device that protects an occupant seated on a vehicle seat of a vehicle from an impact when the impact is applied to the vehicle from an obliquely front outer side of the vehicle seat.

BACKGROUND ART

When an impact is applied to a wheeled vehicle from an obliquely front outer side of a wheeled-vehicle seat due to an oblique collision or the like, an upper body of an occupant seated on the wheeled-vehicle seat tends to move toward the obliquely front outer side, which is the side to which the impact is applied, due to inertia.

In this case, an airbag device is effective in which, when an impact is applied to the wheeled vehicle from the obliquely front outer side of the wheeled-vehicle seat, or when it is predicted that an impact is to be applied to the wheeled vehicle, an airbag is deployed and inflated by an inflation gas to protect the occupant seated on the wheeled-vehicle seat from the impact.

For example, an airbag of an airbag device disclosed in JP2006-8105A includes a main inflation portion (airbag main body portion) and an auxiliary inflation portion (airbag protruding portion). Here, in a width direction of a seatback of a wheeled-vehicle seat, a side closer to a central portion of the seatback in the width direction is defined as an inner side, and a side farther from the central portion is defined as an outer side. The main inflation portion is deployed and inflated forward at an outer side of an upper body of an occupant. A front end portion of the main inflation portion is positioned at an obliquely front outer side with respect to a head portion of the occupant.

The auxiliary inflation portion includes an annular side portion constituting an outer peripheral portion of the auxiliary inflation portion, a front main body portion surrounded by a front edge portion of the annular side portion, and a rear main body portion surrounded by a rear edge portion of the annular side portion. The auxiliary inflation portion is joined to the front end portion of the main inflation portion at the annular side portion, in a state of being in communication with the main inflation portion. An inflation gas is supplied from the main inflation portion to the auxiliary inflation portion through the communication portion. The auxiliary inflation portion is deployed and inflated toward the inner side from the front end portion of the main inflation portion, more specifically, toward a position forward of the head portion of the occupant.

Therefore, the upper body of the occupant that tends to move toward the obliquely front outer side as described above can be caught by the main inflation portion and the auxiliary inflation portion, and the upper body can be protected from an impact.

The parenthesized words following the member names indicate member names used in JP2006-8105A.

SUMMARY OF INVENTION

In recent years, there has been a demand to prevent phenomena. The phenomena include one in which an upper body of an occupant moves when an impact is applied to a wheeled vehicle from an obliquely front outer side of a wheeled-vehicle seat, and one in which a head portion of the occupant rotates about an axis of a neck portion when the impact is applied.

However, the airbag device disclosed in JP2006-8105A is designed mainly for preventing the phenomenon in which the upper body of an occupant moves, and prevention of rotation of the head portion is not considered.

Therefore, when the head portion comes into contact with the auxiliary inflation portion, the auxiliary inflation portion may rotate toward an outer side in a front direction about a joint portion with the main inflation portion. Therefore, with respect to the airbag device disclosed in JP2006-8105A, there is room for improvement in terms of preventing the rotation of the head portion about the axis of the neck portion.

Solution to Problem

To solve the above problem, there is provided an airbag device for protecting an occupant seated on a vehicle seat of a vehicle from an impact by deploying and inflating an airbag with an inflation gas in a case where the impact is applied to the vehicle from an obliquely front outer side of the vehicle seat or in a case where it is predicted that the impact is to be applied to the vehicle. When in a width direction of a seatback of the vehicle seat, a side closer to a central portion of the seatback in the width direction is defined as an inner side and a side farther from the central portion of the seatback in the width direction is defined as an outer side, the airbag includes a main inflation portion that is to be deployed and inflated at the outer side of an upper body of the occupant, and an auxiliary inflation portion that is disposed at a position adjacent to the inner side of the main inflation portion and that is to be deployed and inflated at an obliquely front outer side of a head portion of the occupant by the inflation gas passing through the main inflation portion. The auxiliary inflation portion is joined to the main inflation portion in a joining area, in a state of being in communication with the main inflation portion. The auxiliary inflation portion includes an annular side portion constituting an outer peripheral portion, an outer main body portion surrounded by an outer edge portion of the annular side portion, and an inner main body portion surrounded by an inner edge portion of the annular side portion. In the auxiliary inflation portion whose deployment and inflation are completed, a maximum dimension in a facing direction in which the outer main body portion and the inner main body portion face each other is set to be smaller than a dimension in a direction orthogonal to the facing direction. The outer main body portion is joined to the main inflation portion as the joining area of the auxiliary inflation portion.

According to the above configuration, when the impact is applied to the vehicle from the obliquely front outer side of the vehicle seat, the upper body including the head portion of the occupant seated on the vehicle seat tends to move toward the obliquely front outer side, which is the side to which the impact is applied, due to inertia. At this time, the head portion of the occupant tends to rotate about an axis of a neck portion of the occupant.

On the other hand, in the airbag device, the inflation gas is supplied to the airbag in a case where the impact is applied to the vehicle from the obliquely front outer side of the vehicle seat, or in a case where it is predicted that the impact is to be applied to the vehicle. A part of the inflation gas supplied to the main inflation portion flows into the auxiliary inflation portion communicating with the main inflation portion, through the communication portion. With the inflation gas, the main inflation portion and the auxiliary inflation portion are deployed and inflated.

Here, the main inflation portion is deployed and inflated at an outer side of the upper body of the occupant. Therefore, the upper body of the occupant is caught by the main inflation portion, and the upper body is prevented from moving toward the obliquely front outer side, so that the upper body is protected from the impact.

The auxiliary inflation portion is deployed and inflated at a position adjacent to the inner side of the main inflation portion, which is an obliquely front outer side of the head portion of the occupant. Therefore, even if the head portion of the occupant is about to rotate about the axis of the neck portion, the rotation is prevented by contact with the auxiliary inflation portion and the main inflation portion.

In particular, the auxiliary inflation portion has the outer main body portion as the joining area, and is joined to the main inflation portion in the joining area. Here, in the auxiliary inflation portion whose deployment and inflation are completed, the maximum dimension of the outer main body portion and the inner main body portion in the facing direction is smaller than the dimension of the outer main body portion and the inner main body portion in the direction orthogonal to the facing direction. Therefore, as described above, when the outer main body portion is set as the joining area, the joining area can be wider than when the annular side portion is set as the joining area. When the auxiliary inflation portion is joined to the main inflation portion in the wide joining area, a posture of the auxiliary inflation portion with respect to the main inflation portion is stabilized. A phenomenon in which the auxiliary inflation portion rotates toward a front outer side about a joint portion with the main inflation portion due to contact with the head portion is prevented. A phenomenon in which the performance of preventing the rotation of the head portion about the axis of the neck portion is lowered due to the rotation of the auxiliary inflation portion is prevented.

In the airbag device described above, it is preferable that, when deployment and inflation of the main inflation portion and the auxiliary inflation portion are completed, both the main inflation portion and the auxiliary inflation portion are inclined with respect to a front-rear direction such that a front side of the main inflation portion and a front side of the auxiliary inflation portion are positioned at a front outer side.

According to the above configuration, the auxiliary inflation portion is deployed and inflated at a front side in a movement direction of the head portion. In addition, the main inflation portion and the auxiliary inflation portion, whose deployment and inflation are completed, are inclined with respect to the front-rear direction such that the front side of the main inflation portion and the front side of the auxiliary inflation portion are positioned at the front outer side. Due to this inclination, a boundary portion between the main inflation portion and the auxiliary inflation portion is positioned at the front side in the movement direction of the head portion.

Therefore, the head portion is caught by both the main inflation portion and the auxiliary inflation portion, and the rotation of the head portion about the neck portion can be further prevented.

In the airbag device described above, an auxiliary communication hole, with which an inside and an outside of the auxiliary inflation portion communicate with each other, is preferably formed in the outer main body portion, a main communication hole, with which an inside and an outside of the main inflation portion communicate with each other, is preferably formed in a portion of the main inflation portion adjacent to the auxiliary communication hole, and a peripheral portion of the main communication hole in the main inflation portion and a peripheral portion of the auxiliary communication hole in the outer main body portion are preferably overlapped with each other and joined to each other by an annular joint portion.

According to the above configuration, the peripheral portion of the main communication hole in the main inflation portion and the peripheral portion of the auxiliary communication hole in the outer main body portion are joined by the annular joint portion, whereby the auxiliary inflation portion is joined to the main inflation portion in the joining area.

The main inflation portion and the auxiliary inflation portion communicate with each other via the main communication hole and the auxiliary communication hole. Therefore, a part of the inflation gas supplied to the main inflation portion flows into the auxiliary inflation portion through the main communication hole and the auxiliary communication hole.

In the airbag device described above, it is preferable that a combination of the main communication hole, the auxiliary communication hole, and the annular joint portion is provided at a plurality of positions in the joining area.

According to the above configuration, the combination of the main communication hole, the auxiliary communication hole, and the annular joint portion is provided at a plurality of positions in the joining area, so that the auxiliary inflation portion is joined to the main inflation portion at a plurality of positions in the joining area.

The main inflation portion and the auxiliary inflation portion communicate with each other via the main communication hole and the auxiliary communication hole of each of the combinations provided at a plurality of positions in the joining area. Therefore, a part of the inflation gas supplied to the main inflation portion flows into the auxiliary inflation portion through the main communication hole and the auxiliary communication hole of each combination.

In the airbag device described above, when a distance between a front end portion of the annular joint portion positioned at a foremost position and a rear end portion of the annular joint portion positioned at a rearmost position in the joining area is defined as a front-rear length of the joining area, the maximum dimension in the facing direction is preferably set to be smaller than the front-rear length of the joining area.

According to the above configuration, the front-rear length of the joining area, which is a region where the auxiliary inflation portion is actually joined to the main inflation portion, is compared with the maximum dimension of the auxiliary inflation portion in the facing direction. The maximum dimension is set to be smaller than the front-rear length.

Therefore, the auxiliary inflation portion is joined to the main inflation portion in a wider joining area than in a case where the annular side portion is set as the joining area, and the posture of the auxiliary inflation portion with respect to the main inflation portion is stabilized. Accordingly, a phenomenon in which the auxiliary inflation portion rotates about the joint portion with the main inflation portion due to contact with the head portion is prevented.

According to the airbag device described above, when an impact is applied to a vehicle from an obliquely front outer side of a vehicle seat, a head portion of an occupant can be prevented from rotating about an axis of a neck portion.

DESCRIPTION OF EMBODIMENTS

Hereinafter, an embodiment in which an airbag device is embodied as a far-side airbag device for a wheeled vehicle will be described with reference to FIGS. 1 to 7.

In the following description, an advancing direction of a wheeled vehicle is defined as a front side, and a reversing direction is defined as a rear side. An up-down direction means an up-down direction of the wheeled vehicle. A left-right direction is a wheeled-vehicle width direction, and coincides with the left-right direction at the time of advancing of the wheeled vehicle. In addition, it is assumed that an occupant having the same physique as that of a crash test dummy sits on a wheeled-vehicle seat in a predetermined appropriate posture.

Figure 1:
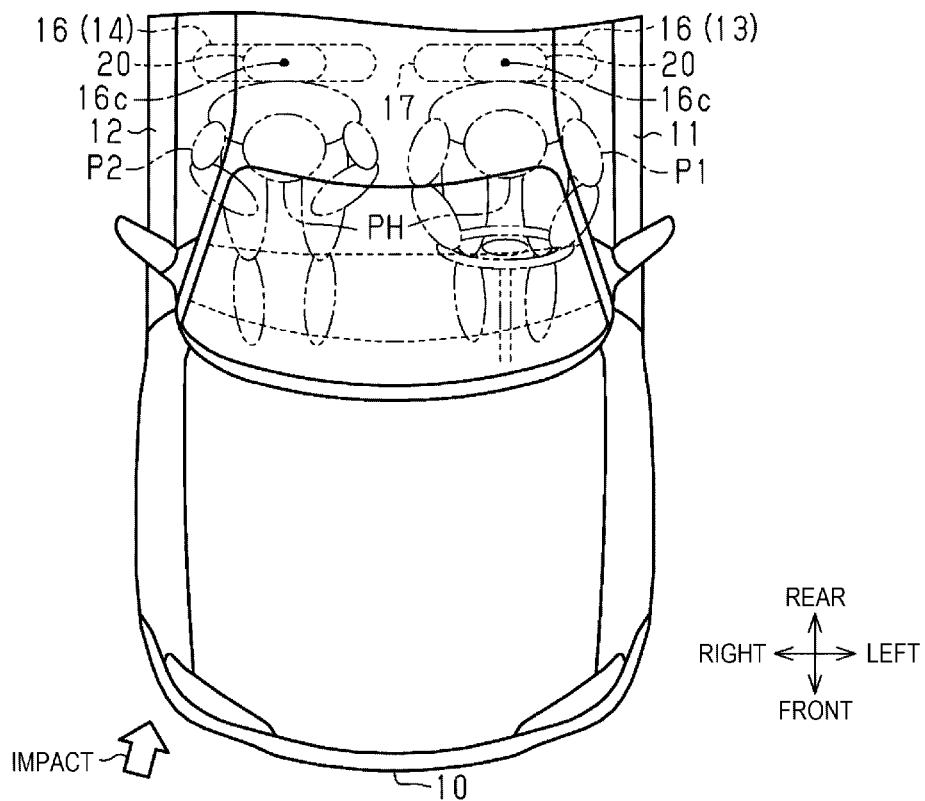
FIG. 1 is a partial plan view of a wheeled vehicle to which a far-side airbag device is applied in an embodiment.

As illustrated in FIG. 1, two side portions of a wheeled vehicle 10 in the left-right direction are implemented by side wall portions 11 and 12 respectively, each including a door, a pillar, and the like. In a wheeled-vehicle interior, wheeled-vehicle seats 13 and 14 as front seats are arranged side by side in the left-right direction. The wheeled-vehicle seat 13 close to the side wall portion 11 functions as a driver's seat, and an occupant (driver) P1 is seated on the wheeled-vehicle seat 13. The wheeled-vehicle seat 14 close to the side wall portion 12 functions as a front passenger seat, and an occupant (front passenger seat occupant) P2 is seated on the wheeled-vehicle seat 14. The wheeled-vehicle seats 13 and 14 have the same configuration. Therefore, only the wheeled-vehicle seat 13 will be described here.

<Schematic Configuration of Wheeled-Vehicle Seat 13>

Figure 2:
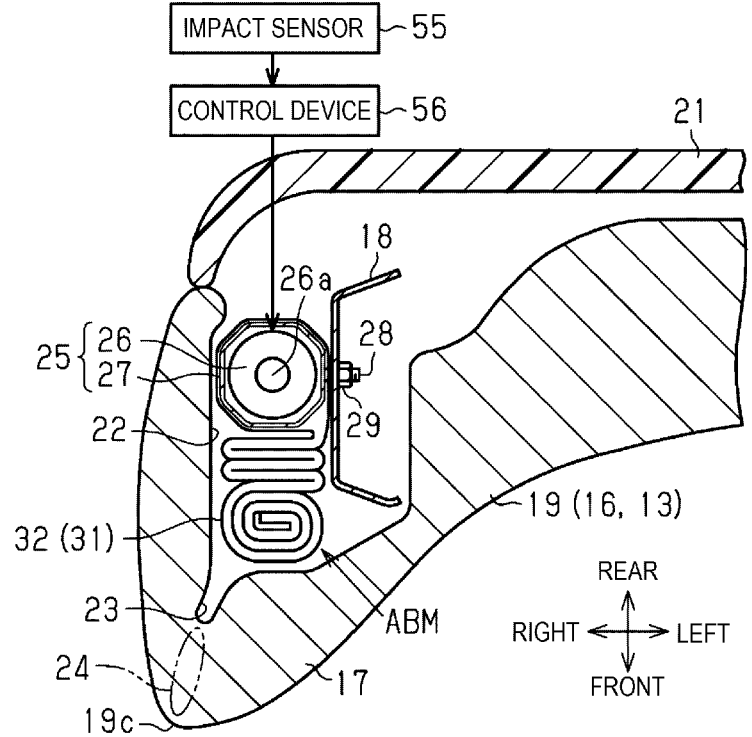
FIG. 2 is a partial cross-sectional plan view illustrating an internal structure of a side portion of a seatback in which an airbag module is stored in the embodiment.
Figure 4:
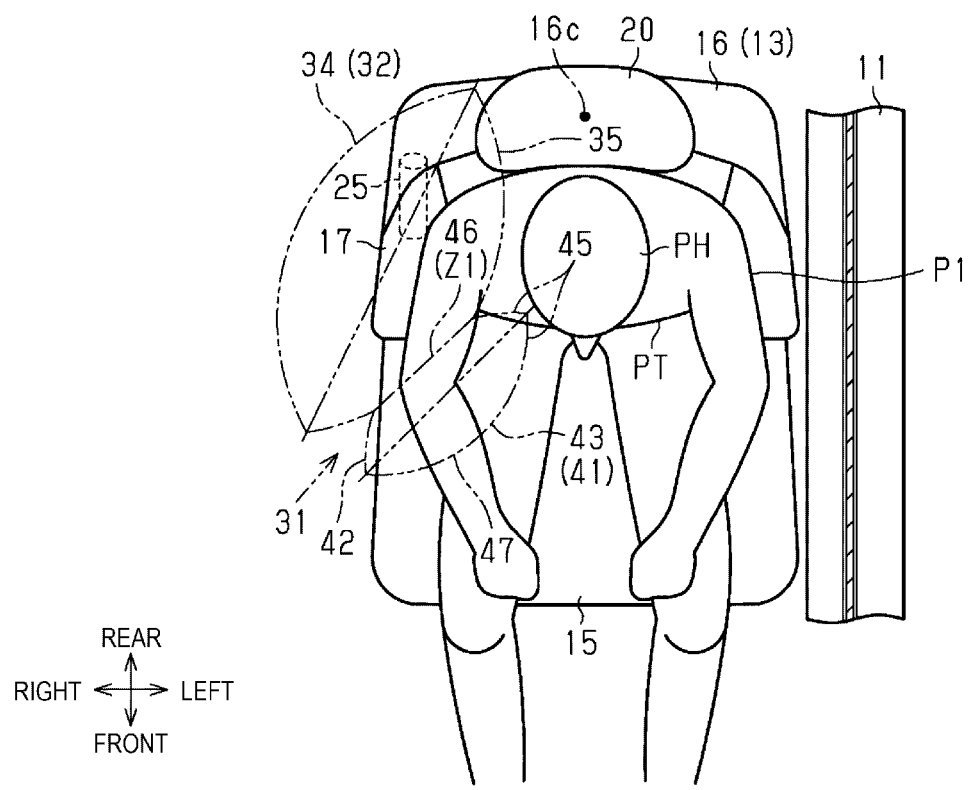
FIG. 4 is a partial plan view illustrating a positional relationship between the wheeled-vehicle seat, the airbag, the occupant, and a side wall portion in the embodiment.

As illustrated in FIGS. 2 and 4, the wheeled-vehicle seat 13 includes a seat cushion 15, a seatback 16, and a headrest 20. The seat cushion 15 is a portion on which the occupant P1 is seated, and is configured to be slidable in a front-rear direction. The seatback 16 supports the upper body of the occupant P1 from the rear side. The seatback 16 stands upright from a rear portion of the seat cushion 15, and is configured such that an inclination angle thereof can be adjusted. The headrest 20 supports a head portion PH of the occupant P1 from the rear side, and is disposed on the seatback 16. The wheeled-vehicle seat 13 is disposed in a posture in which the seatback 16 faces the front side. A width direction of the wheeled-vehicle seat 13 disposed in this manner coincides with the left-right direction.

Here, as illustrated in FIG. 4, in order to specify portions of the seatback 16 in the width direction, a central portion 16c of the seatback 16 in the width direction is used as a reference. In the width direction, a side closer to the central portion 16c is referred to as an "inner side", and a side farther from the central portion 16c is referred to as an "outer side".

FIG. 2 illustrates an internal structure of a side portion 17 of the seatback 16 of the wheeled-vehicle seat 13 on a side close to the wheeled-vehicle seat 14. A seat frame that forms a framework portion of the seatback 16 is disposed inside the seatback 16.

A side frame portion 18 constituting a part of the seat frame is disposed inside the side portion 17. The side frame portion 18 is formed by subjecting a metal plate to bending or the like.

A seat pad 19 made of an elastic material such as urethane foam is disposed on the front side of the seat frame including the side frame portion 18. A backboard 21 made of a synthetic resin or the like is disposed on the rear side of the seat frame. Although the seat pad 19 is covered with a skin, the skin is not illustrated in FIG. 2.

A storage portion 22 is provided inside the side portion 17, at an outer side of the side frame portion 18. The storage portion 22 is a space in which an airbag module ABM, which is a main portion of the far-side airbag device, is stored.

A slit 23 extends toward an obliquely front outer side from an outer corner portion of a front portion of the storage portion 22. A portion sandwiched between a front corner portion 19c of the seat pad 19 and the slit 23 (that is, a portion surrounded by a frame of a two-dot chain line in FIG. 2) constitutes a breakage-expected portion 24 to be broken by an airbag 31 to be described later.

The airbag module ABM includes, as main components, the airbag 31 and a gas generator 25 that supplies an inflation gas to the airbag 31. Next, each of these components will be described.

<Gas Generator 25>

The gas generator 25 includes an inflator 26 and a retainer 27 that covers the inflator 26. Here, a pyrotechnic type inflator is employed as the inflator 26. The inflator 26 has a substantially columnar shape, and a gas generating agent (not illustrated) that generates an inflation gas is accommodated inside the inflator 26. The inflator 26 includes a gas ejection portion 26a at an upper end portion thereof. A harness (not illustrated), which is an input wiring of an actuation signal to the inflator 26, is connected to a lower end portion of the inflator 26.

Instead of the pyrotechnic type inflator using a gas generating agent, the inflator 26 may be of a type that ejects an inflation gas by using an explosive or the like to break a partition wall of a high-pressure gas cylinder filled with a high-pressure gas.

On the other hand, the retainer 27 is a member that functions as a diffuser for controlling a direction in which the inflation gas is ejected, and that fastens the inflator 26, the airbag 31 and the like to the side frame portion 18. Most of the retainer 27 is formed in a substantially tubular shape by bending a plate material such as a metal plate. A bolt 28 extending toward the inner side is fixed to the retainer 27 as a member for attaching the retainer 27 to the side frame portion 18.

In the gas generator 25, the inflator 26 and the retainer 27 may be integrated. The gas generator 25 may only include the inflator 26, with the retainer 27 not being used. In this case, the bolt 28 is fixed to the inflator 26.

<Airbag 31>

Figure 3:
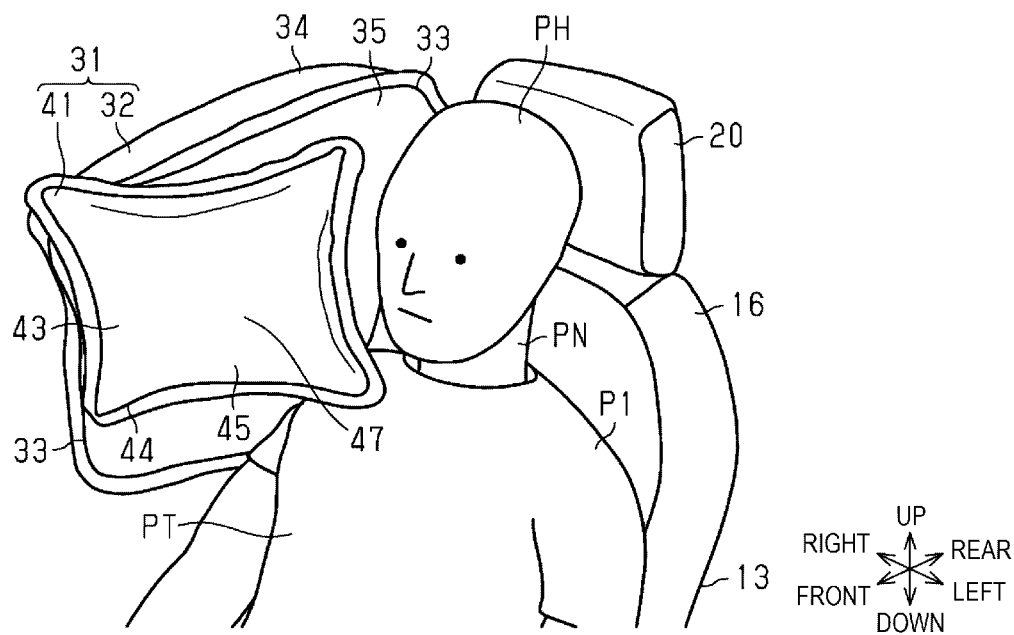
FIG. 3 is a partial perspective view illustrating an airbag, of which both a main inflation portion and an auxiliary inflation portion are deployed and inflated, together with an occupant and a wheeled-vehicle seat in the embodiment.

As illustrated in FIGS. 3 and 4, the airbag 31 includes a main inflation portion 32 and an auxiliary inflation portion 41 having a smaller capacity than the main inflation portion 32. Each of the main inflation portion 32 and the auxiliary inflation portion 41 is formed of a fabric piece (also referred to as a base fabric, a panel fabric, or the like). As the fabric piece, a material having a high strength and flexibility and capable of being easily folded is used, for example, a woven fabric formed of a polyester yarn, a polyamide yarn, or the like.

The main inflation portion 32 is formed by, for example, folding a fabric piece into two pieces and overlapping the two pieces in the left-right direction, and joining overlapping portions thereof by a main peripheral joint portion 33. Here, in order to distinguish between the two overlapped portions of the main inflation portion 32, the portion positioned on the outer side is referred to as a main fabric portion 34, and the portion positioned on the inner side is referred to as a main fabric portion 35.

The main inflation portion 32 may be implemented by two fabric pieces. In this case, the main inflation portion 32 is formed by overlapping the two fabric pieces in the left-right direction and joining the two fabric pieces over entire circumferences thereof by the main peripheral joint portion 33.

Although the main peripheral joint portion 33 is formed by sewing, the main peripheral joint portion 33 may be formed by other methods, for example, adhesion. This also applies to an auxiliary peripheral joint portion 44 and an annular joint portion 53, which will be described later.

The main inflation portion 32 takes a major part of the upper body of the occupant P1, that is, a part covering from a chest portion PT to the head portion PH in the present embodiment, as a protection target part. The main inflation portion 32 is formed to have a shape and a size that allow the main inflation portion 32 to be deployed and inflated at the outer side of the protection target part.

When the deployment and inflation of the main inflation portion 32 are completed, the main inflation portion 32 is in a posture of being inclined with respect to the front-rear direction such that a front side of the main inflation portion 32 is positioned at the front outer side. The inclined posture of the main inflation portion 32 is achieved by, for example, an outer tether (not illustrated). The outer tether is disposed outside the main inflation portion 32, and spans between the main inflation portion 32 and a member having a high strength in the side portion 17 of the seatback 16, for example, the side frame portion 18. The outer tether is formed of a band-shaped fabric piece made of the same material as the main inflation portion 32 and the auxiliary inflation portion 41.

In a rear end portion of the main inflation portion 32, the gas generator 25 is disposed in a posture of extending substantially in the up-down direction. Further, the bolt 28 is passed through the main inflation portion 32 (the main fabric portion 35), whereby the gas generator is locked in a state of being positioned with respect to the main inflation portion 32.

On the other hand, the auxiliary inflation portion 41 is disposed at a position adjacent to the inner side of a front portion of the main inflation portion 32. The auxiliary inflation portion 41 takes the head portion PH of the occupant P1 as a protection target part, and is formed to have a shape and a size so as to be able to be deployed and inflated at a position that is the obliquely front outer side of the protection target part.

Figure 5:
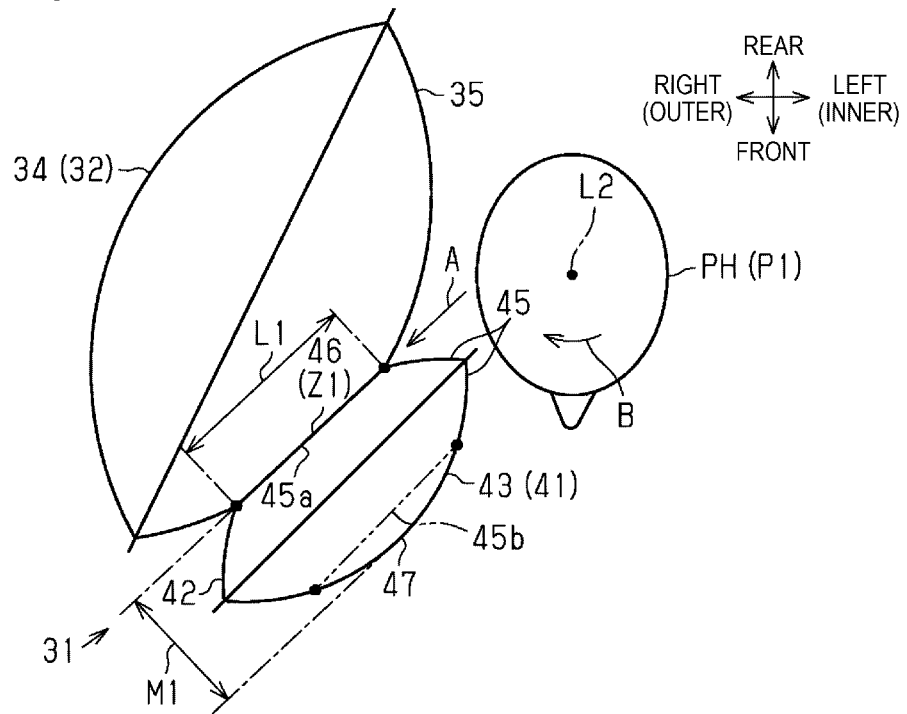
FIG. 5 is a partial plan view illustrating the deployed and inflated airbag together with a head portion of the occupant in the embodiment.
Figure 6:
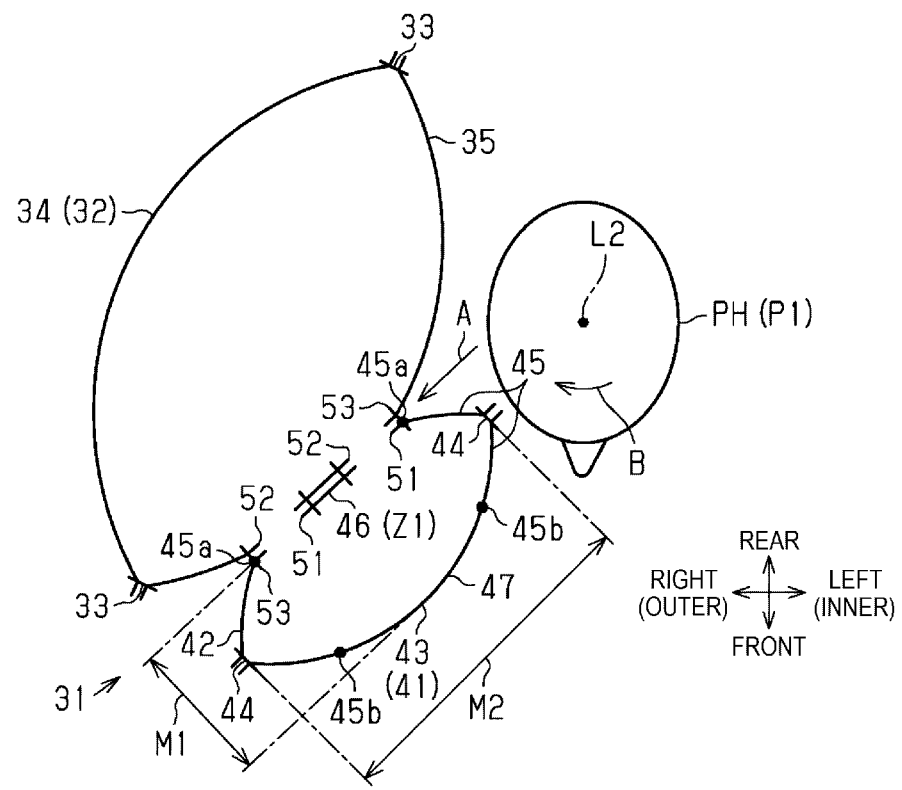
FIG. 6 is a partial cross-sectional plan view illustrating an internal structure of the deployed and inflated airbag together with the head portion of the occupant in the embodiment.

As illustrated in FIGS. 5 and 6, the auxiliary inflation portion 41 includes an auxiliary fabric portion 42 adjacent to the main fabric portion 35 of the main inflation portion 32, and an auxiliary fabric portion 43 disposed on an opposite side of the auxiliary fabric portion 42 from the main inflation portion 32. The auxiliary fabric portions 42 and 43 may be formed of separate fabric pieces, or may be formed by bending a single fabric piece. A peripheral edge portion of the auxiliary fabric portion 42 and a peripheral edge portion of the auxiliary fabric portion 43 are overlapped and joined by the auxiliary peripheral joint portion 44.

The auxiliary inflation portion 41 includes an annular side portion 45, an outer main body portion 46, and an inner main body portion 47 in a state where the deployment and inflation of the auxiliary inflation portion 41 are completed. The annular side portion 45 includes an outer peripheral portion of the auxiliary fabric portion 42 and an outer peripheral portion of the auxiliary fabric portion 43. The annular side portion 45 has a band shape and constitutes an outer peripheral portion of the auxiliary inflation portion 41. The outer main body portion 46 is defined by a region of the auxiliary fabric portion 42 surrounded by an outer edge 45a of the annular side portion 45. The inner main body portion 47 is defined by a region of the auxiliary fabric portion 43 surrounded by an inner edge 45b of the annular side portion 45.

In the auxiliary inflation portion 41 whose deployment and inflation are completed, a maximum dimension M1 in a facing direction, which is a direction in which the outer main body portion 46 and the inner main body portion 47 face each other, is set to be smaller than a dimension M2 in a direction orthogonal to the facing direction. With such a setting, the auxiliary inflation portion 41 has an outer shape like a cushion whose thickness direction is the facing direction.

Figure 7:
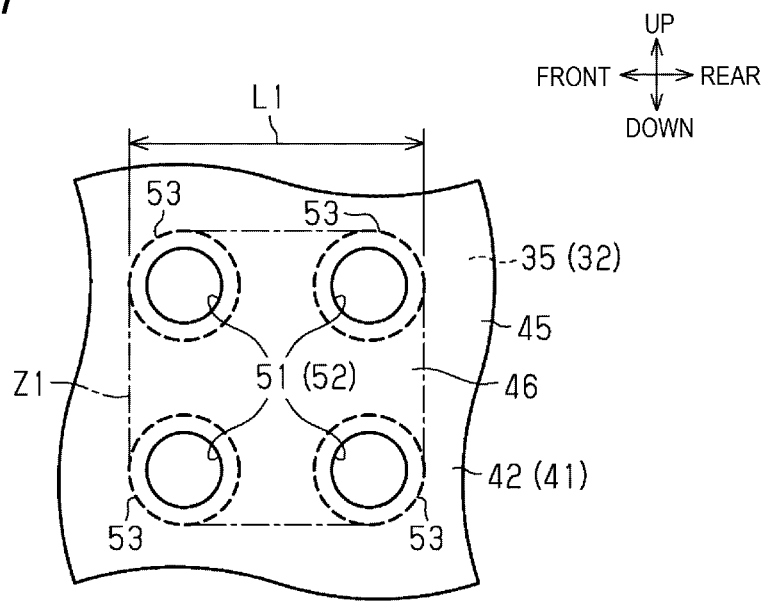
FIG. 7 is a partial side view illustrating a joint portion of an outer main body portion of the auxiliary inflation portion to the main inflation portion in the embodiment.

As illustrated in FIGS. 6 and 7, the auxiliary inflation portion 41 has the outer main body portion 46 as a joining area Z1, and is joined to the main inflation portion 32 in the joining area Z1, in a state of being in communication with the main inflation portion 32.

More specifically, an auxiliary communication hole 51, with which an inside and an outside of the auxiliary inflation portion 41 communicate with each other, is formed in the outer main body portion 46. In the present embodiment, the auxiliary communication hole 51 is a hole having a circular shape. A main communication hole 52, with which an inside and an outside of the main inflation portion 32 communicate with each other, is formed in the main fabric portion 35 of the main inflation portion 32 at a position adjacent to the auxiliary communication hole 51. The main communication hole 52 is a hole having the same or substantially the same shape and size as the auxiliary communication hole 51.

A peripheral portion of the main communication hole 52 in the main fabric portion and a peripheral portion of the auxiliary communication hole 51 in the outer main body portion 46 are overlapped with each other and joined by the annular joint portion 53. In FIG. 7, the annular joint portion 53 is indicated by a broken line thicker than a general broken line.

With the annular joint portion 53, the joining to the main inflation portion 32 at the joining area Z1 is implemented. The auxiliary inflation portion 41 communicates with the main inflation portion 32 through the main communication hole 52 and the auxiliary communication hole 51.

Combinations of the main communication hole 52, the auxiliary communication hole 51, and the annular joint portion 53 are provided at a plurality of positions in the joining area Z1. In the present embodiment, four combinations are provided at equal intervals in the front-rear direction and the up-down direction in the joining area Z1. Therefore, the main inflation portion 32 and the auxiliary inflation portion 41 communicate with each other via the main communication hole 52 and the auxiliary communication hole 51 of each of the combinations provided at the plurality of positions in the joining area Z1.

In the two combinations positioned at a front side, a front end portion of each annular joint portion 53 is positioned at a front end portion of the joining area Z1. In the two combinations positioned at a rear side, a rear end portion of each annular joint portion 53 is positioned at a rear end portion of the joining area Z1.

In the two combinations positioned at an upper side, an upper end portion of each annular joint portion 53 is positioned at an upper end portion of the joining area Z1. In the two combinations positioned at a lower side, a lower end portion of each annular joint portion 53 is positioned at a lower end portion of the joining area Z1.

As described above, the auxiliary inflation portion 41 joined to the main inflation portion 32, whose deployment and inflation are completed, is in a posture of being inclined with respect to the front-rear direction such that a front side of the auxiliary inflation portion 41 is positioned at the front outer side, in the same manner as the main inflation portion 32.

Here, as illustrated in FIGS. 5 and 7, in the joining area Z1, a distance between the front end portion of the annular joint portion 53 positioned at the foremost position and the rear end portion of the annular joining portion 53 positioned at the rearmost position is defined as a front-rear length L1 of the joining area Z1. In the present embodiment, the distance between the front end portion of the front annular joint portion 53 and the rear end portion of the rear annular joint portion 53 is the front-rear length L1 of the joining area Z1. The front-rear length L1 is set to be larger than the maximum dimension M1 of the auxiliary inflation portion 41.

As illustrated in FIG. 2, the airbag module ABM is in a compact storage form by folding a portion of the main inflation portion 32, which is different from the portion (rear end portion) in which the gas generator 25 is stored, together with the auxiliary inflation portion 41, the outer tether, and the like. In FIG. 2, illustration of the auxiliary inflation portion 41, the outer tether, and the like is omitted.

The airbag module ABM in the storage form is stored in the storage portion 22. The bolt 28 exposed from the airbag 31 is passed through the side frame portion 18 from the outer side. A portion of the bolt 28 protrudes toward the inner side from the side frame portion 18, and a nut 29 is fastened to the protruding portion. By this fastening, the gas generator 25 is fixed to the side frame portion 18 together with the main inflation portion 32 from the outer side.

The gas generator 25 may be fixed to the side frame portion 18 by a member different from the bolt 28 and the nut 29 described above. When the gas generator 25 only includes the inflator 26, the inflator 26 may be fixed to the side frame portion 18 by the nut 29 and the bolt 28 fixed to the inflator 26.

The far-side airbag device includes an impact sensor 55 and a control device 56 in addition to the airbag module ABM described above. The impact sensor 55 includes an acceleration sensor or the like, and detects an impact applied to the wheeled vehicle 10 from an obliquely front outer side of the wheeled-vehicle seat 13.

The control device 56 is configured as a circuit. The circuit includes one or more processors that operate in accordance with a computer program (software), one or more dedicated hardware circuits that execute at least a part of various processes, or a combination thereof. The control device 56 controls the actuation of the gas generator 25 based on a detection signal from the impact sensor 55. In the present embodiment, when the impact sensor 55 detects an impact from the obliquely front outer side, the control device 56 outputs an actuation signal for actuating the gas generator 25 to the gas generator 25.

A seatbelt device (not illustrated) for restraining the occupant P1 seated on the wheeled-vehicle seat 13 to the wheeled-vehicle seat 13 is provided in the wheeled-vehicle interior.

Next, an operation of the present embodiment configured as described above will be described. Effects produced by the operation will also be described. As a precondition, it is assumed that the occupant P1 is seated on the wheeled-vehicle seat 13 in an appropriate posture, and the occupant P1 is restrained to the wheeled-vehicle seat 13 by a seatbelt device.

<(1) Joining of Auxiliary Inflation Portion 41 to Main Inflation Portion 32>

(1-1) As illustrated in FIG. 6, in the present embodiment, the peripheral portion of the main communication hole 52 of the main inflation portion 32 and the peripheral portion of the auxiliary communication hole 51 of the outer main body portion 46 are joined together by the annular joint portion 53.

By such joining, the auxiliary inflation portion 41 can be joined to the main inflation portion 32 in a state where the auxiliary inflation portion 41 communicates with the main inflation portion 32 in the joining area Z1.

(1-2) As illustrated in FIGS. 6 and 7, in the present embodiment, combinations of the main communication hole 52, the auxiliary communication hole 51, and the annular joint portion 53 are provided at a plurality of positions in the joining area Z1.

Therefore, the auxiliary inflation portion 41 can be joined to the main inflation portion 32 at a plurality of positions in the joining area Z1.

In designing the airbag 31, a shape and a size of the joining area Z1 can be changed by changing the positions of the plurality of combinations.

<(2) at Time of Non-Actuation of Far-Side Airbag Device>

When the impact sensor 55 illustrated in FIG. 2 does not detect that an impact is applied to the wheeled vehicle 10 from the obliquely front outer side of the wheeled-vehicle seat 13, the control device 56 does not output an actuation signal to the gas generator 25. No inflation gas is ejected from the gas ejection portion 26a of the inflator 26. As illustrated in FIG. 2, the airbag module ABM continues to be stored in the storage portion 22 in a storage form.

<(3) at Time of Actuation of Far-Side Airbag Device>

Next, a case will be described where an impact is applied to a front side portion of the wheeled vehicle 10 from the obliquely front outer side of the wheeled-vehicle seat 13 due to an oblique collision or the like, as indicated by an arrow in FIG. 1, during traveling of the wheeled vehicle 10 or the like.

In this case, as illustrated in FIGS. 5 and 6, the upper body including the head portion PH of the occupant P1 tends to move toward the obliquely front outer side due to inertia, which is a side to which an impact is applied, as indicated by an arrow A. At this time, the head portion PH of the occupant P1 tends to rotate about an axis L2 of the neck portion PN as indicated by an arrow B.

(3-1) On the other hand, in the far-side airbag device of the present embodiment, when the impact sensor 55 in FIG. 2 detects that the impact is applied, the control device 56 outputs the actuation signal to the gas generator 25 in response to the detection signal. When an inflation gas is ejected from the gas ejection portion 26a of the inflator 26 in response to the actuation signal, the inflation gas is supplied to the main inflation portion 32 of the airbag 31 in the storage form.

When the inflation gas is supplied to the main inflation portion 32, an internal pressure of the main inflation portion 32 increases. The main inflation portion 32 is inflated while being unfolded, that is, while being deployed.

During the deployment and inflation, the main inflation portion 32 presses the seat pad 19 near the storage portion 22 in FIG. 2 together with the auxiliary inflation portion 41, the outer tether, and the like, and breaks the seat pad 19 at the breakage-expected portion 24. Thereafter, the supply of the inflation gas is continued, so that the main inflation portion 32 exits to the outside of the storage portion 22 through the broken portion together with the auxiliary inflation portion 41 and the like in a state where a portion thereof fixed to the side frame portion 18 remains in the storage portion 22. The main inflation portion 32 is deployed and inflated toward a front upper side, at the outer side of the upper body of the occupant P1, that is, between the wheeled-vehicle seats 13 and 14, as illustrated in FIGS. 3 and 4. Therefore, the upper body of the occupant P1 is caught by the main inflation portion 32, and is prevented from moving toward the obliquely front outer side, so that the upper body can be protected from the impact.

(3-2) As illustrated in FIGS. 6 and 7, the main inflation portion 32 and the auxiliary inflation portion 41 communicate with each other via the main communication hole 52 and the auxiliary communication hole 51. Therefore, a part of the inflation gas supplied to the main inflation portion 32 flows into the auxiliary inflation portion 41 through the main communication hole 52 and the auxiliary communication hole 51 during deployment and inflation of the main inflation portion 32.

In particular, in the present embodiment, the combinations of the main communication hole 52, the auxiliary communication hole 51, and the annular joint portion 53 are provided at a plurality of positions in the joining area Z1. Therefore, a part of the inflation gas passing through the main inflation portion 32 flows into the auxiliary inflation portion 41 through the main communication hole 52 and the auxiliary communication hole 51 of each of the combinations at the plurality of positions in the joining area Z1.

With the inflation gas flowing in as described above, as illustrated in FIGS. 5 and 6, the auxiliary inflation portion 41 is deployed and inflated at the position adjacent to the inner side of the front portion of the main inflation portion 32, which is the obliquely front outer side of the head portion PH of the occupant P1.

Therefore, even if the head portion PH of the occupant P1 is about to rotate about the axis L2 of the neck portion PN, the head portion PH is caught by the auxiliary inflation portion 41 and the main inflation portion 32. The head portion PH can be protected from the impact by preventing the rotation of the head portion PH about the axis L2, that is, by restraining the head portion PH.

(3-3) In particular, in the present embodiment, the outer main body portion 46 is defined as the joining area Z1, and the auxiliary inflation portion 41 is joined to the main inflation portion 32 in the joining area Z1.

In the auxiliary inflation portion 41 whose deployment and inflation are completed, the maximum dimension M1 of the outer main body portion 46 and the inner main body portion 47 in the facing direction is smaller than the dimension M2 of the outer main body portion 46 and the inner main body portion 47 in the direction orthogonal to the facing direction.

Therefore, as described above, when the outer main body portion 46 is set as the joining area Z1, the joining area Z1 can be wider than when the annular side portion 45 is set as the joining area Z1. When the auxiliary inflation portion 41 is joined to the main inflation portion 32 in the wide joining area Z1, the posture of the auxiliary inflation portion 41 with respect to the main inflation portion 32 is stabilized.

A phenomenon in which the auxiliary inflation portion 41 rotates toward the front outer side about a joint portion with the main inflation portion 32 due to contact with the head portion PH is prevented. Therefore, the performance of preventing the rotation of the head portion PH about the axis L2 of the neck portion PN can be prevented from being lowered due to the rotation of the auxiliary inflation portion 41.

(3-4) Further, in the present embodiment, the front-rear length L1 (<M2) of the joining area Z1, which is a region where the auxiliary inflation portion 41 is actually joined to the main inflation portion 32, is compared with the maximum dimension M1 of the auxiliary inflation portion 41. The maximum dimension M1 is set to be smaller than the front-rear length L1 (see FIG. 5).

Therefore, the auxiliary inflation portion 41 is joined to the main inflation portion 32 in the joining area Z1 that is wider than when the annular side portion 45 is set as the joining area Z1, and the posture of the auxiliary inflation portion 41 with respect to the main inflation portion 32 is stabilized.

Therefore, it is possible to prevent a phenomenon in which the auxiliary inflation portion 41 rotates about the joint portion with the main inflation portion 32 due to contact with the head portion PH. Accordingly, the performance of preventing the rotation of the head portion PH about the axis L2 of the neck portion PN can be prevented from being lowered due to the rotation of the auxiliary inflation portion 41.

(3-5) Further, in the present embodiment, the auxiliary inflation portion 41 is deployed and inflated at a front side in a movement direction of the head portion PH. In addition, the main inflation portion 32 and the auxiliary inflation portion 41, whose deployment and inflation are completed, are inclined with respect to the front-rear direction such that the front side of the main inflation portion 32 and the front side of the auxiliary inflation portion 41 are positioned at the front outer side. Therefore, a boundary portion between the main inflation portion 32 and the auxiliary inflation portion 41 is positioned at the front side in the movement direction of the head portion PH.

Therefore, the head portion PH is caught by both the main fabric portion 35 of the main inflation portion 32 and the auxiliary fabric portion 42 of the auxiliary inflation portion 41, and the rotation of the head portion PH about the neck portion PN can be further prevented.

<(4) Other Effects>
(4-1) The main inflation portion 32 is deployed and inflated at the outer side of the upper body of the occupant P1. Therefore, when an impact is applied to the side wall portion 12 from the outer side due to a side collision or the like, the upper body of the occupant P1 tends to move toward the side to which the impact is applied, but the upper body is caught by the main inflation portion 32, and the occupant P1 can be protected from the impact.

The above-described embodiment may be modified as follows. The above-described embodiment and the following modifications can be implemented in combination with each other within a technically consistent range.

<Regarding Airbag 31>

Figure 8:
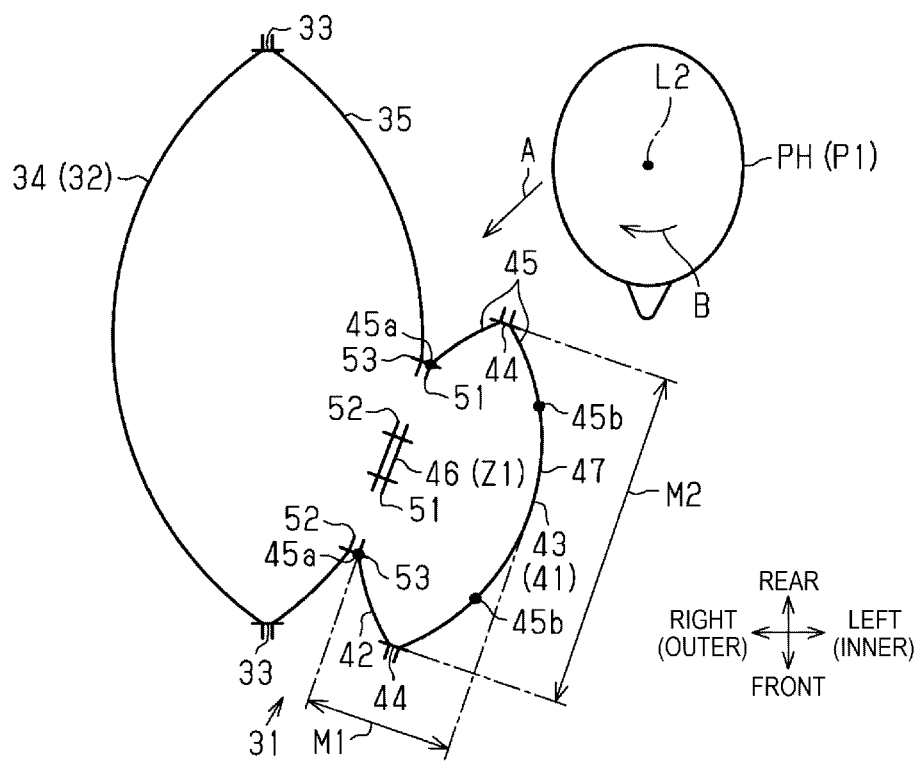
FIG. 8 is a view corresponding to FIG. 6, and is a partial cross-sectional plan view illustrating a deployed and inflated airbag of a modification together with the head portion of the occupant.

As illustrated in FIG. 8, the main inflation portion 32 may take a posture along the front-rear direction in a state in which the deployment and inflation thereof are completed. In this case, a posture (inclination with respect to the front-rear direction) of the main inflation portion 32 and the auxiliary inflation portion 41 with respect to the upper body of the occupant P1, particularly, with respect to the head portion PH, is different from that in the above-described embodiment. However, also in this case, as in the above-described embodiment, the head portion PH is caught by the main inflation portion 32 and the auxiliary inflation portion 41, and the effect of preventing the rotation of the head portion PH about the neck portion PN is obtained.

The shape or size of the main inflation portion 32 may be changed, and the protection target part of the occupant P1 by the main inflation portion 32 may be enlarged, reduced, or changed.

The main inflation portion 32 may be substantially entirely inflated as in the above-described embodiment, and may partially include a non-inflation portion that is not supplied with the inflation gas and is not inflated.

The number of combinations of the main communication hole 52, the auxiliary communication hole 51, and the annular joint portion 53 may be changed to one. In this case, a region of the auxiliary fabric portion 42 surrounded by the annular joint portion 53 is the joining area Z1.

In addition, the number of combinations may be changed to a number different from the number (four) in the above-described embodiment on condition that the number of combinations is plural.

In the case where four combinations of the main communication hole 52, the auxiliary communication hole 51, and the annular joint portion 53 are provided, the combinations may be arranged in a mode different from that in the above-described embodiment.

The shape of the main communication hole 52 and the auxiliary communication hole 51 may be changed to a shape different from the circular shape, for example, a polygonal shape such as a quadrangular shape, or an elliptical shape.

The main communication hole 52 and the auxiliary communication hole 51 may be an elongated hole, a slit, or the like.

<Control Device 56>

The control device 56 may be changed to a specification for outputting an actuation signal to the gas generator 25 when it is predicted that an impact is to be applied to the wheeled vehicle 10 from the obliquely front outer side of the wheeled-vehicle seat 13.

<Application Place of Far-Side Airbag Device>

The far-side airbag device may be applied to the wheeled-vehicle seat 14 instead of or in addition to the wheeled-vehicle seat 13.

The far-side airbag device may be applied not only to front seats (a driver's seat and a front passenger seat) of the wheeled vehicle 10, but also to rear seats (seats in the second and subsequent rows).

In a case of a wheeled-vehicle in which a wheeled-vehicle seat is disposed in a posture in which the seatback 16 faces a side different from the front side, for example, a lateral side, the far-side airbag device is also applicable to these wheeled-vehicle seats.

In a case of a wheeled vehicle in which three or more wheeled-vehicle seats are arranged side by side in the width direction, the far-side airbag device is also applicable to these wheeled-vehicle seats.

<Others>

The airbag device is not limited to the far-side airbag device, and a normal side airbag device may be applied. In this case, the airbag module ABM is stored in the side portion 17 of the seatback 16 of the wheeled-vehicle seat 13, which is farther from the adjacent wheeled-vehicle seat 14, that is, closer to the adjacent side wall portion 11; and the airbag module ABM is stored in the side portion 17 of the seatback 16 of the wheeled-vehicle seat 14, which is farther from the adjacent wheeled-vehicle seat 13, that is, closer to the adjacent side wall portion 12.

The wheeled vehicle to which the airbag device is applied includes not only private cars but also various industrial wheeled vehicles.

The airbag device is also applicable as an airbag device mounted on a vehicle seat in a vehicle different from a wheeled vehicle, for example, an aircraft and a ship.

What is claimed is:

1. An airbag device for protecting an occupant seated on a vehicle seat of a vehicle from an impact by deploying and inflating an airbag with an inflation gas in a case where the impact is applied to the vehicle from an obliquely front outer side of the vehicle seat or in a case where it is predicted that the impact is to be applied to the vehicle, wherein
when in a width direction of a seatback of the vehicle seat, a side closer to a central portion of the seatback in the width direction is defined as an inner side and a side farther from the central portion of the seatback in the width direction is defined as an outer side, the airbag includes
a main inflation portion that is configured to be deployed and inflated and adapted so as to be positioned when deployed and inflated at the outer side of an upper body of the occupant, and
an auxiliary inflation portion that is disposed at a position adjacent to the inner side of the main inflation portion and is configured to be deployed and inflated and adapted so as to be positioned when deployed and inflated at an obliquely front outer side of a head portion of the occupant by the inflation gas passing through the main inflation portion, the auxiliary inflation portion is joined to the main inflation portion in a joining area, in a state of being in communication with the main inflation portion, the auxiliary inflation portion includes an annular side portion constituting an outer peripheral portion, an outer main body portion surrounded by an outer edge portion of the annular side portion, and an inner main body portion surrounded by an inner edge portion of the annular side portion, in the auxiliary inflation portion whose deployment and inflation are completed, a maximum dimension in a facing direction in which the outer main body portion and the inner main body portion face each other is set to be smaller than a dimension in a direction orthogonal to the facing direction, and the outer main body portion is joined to the main inflation portion as the joining area of the auxiliary inflation portion.

2. The airbag device according to claim 1, wherein when deployment and inflation of the main inflation portion and the auxiliary inflation portion are completed, both the main inflation portion and the auxiliary inflation portion are inclined with respect to a front-rear direction such that a front side of the main inflation portion and a front side of the auxiliary inflation portion are positioned at a front outer side.

3. The airbag device according to claim 1, wherein an auxiliary communication hole, with which an inside and an outside of the auxiliary inflation portion communicate with each other, is formed in the outer main body portion, a main communication hole, with which an inside and an outside of the main inflation portion communicate with each other, is formed in a portion of the main inflation portion adjacent to the auxiliary communication hole, and a peripheral portion of the main communication hole in the main inflation portion and a peripheral portion of the auxiliary communication hole in the outer main body portion are overlapped with each other and joined to each other by an annular joint portion.

4. The airbag device according to claim 3, wherein a combination of the main communication hole, the auxiliary communication hole, and the annular joint portion is provided at a plurality of positions in the joining area.

5. The airbag device according to claim 3, wherein when a distance between a front end portion of the annular joint portion positioned at a foremost position and a rear end portion of the annular joint portion positioned at a rearmost position in the joining area is defined as a front-rear length of joining area, the maximum dimension in the facing direction is set to be smaller than the front-rear length of the joining area.

* * * * *